(No Model.)
J. R. HIME, Sr. & W. B. COX.
CLAMP DEVICE.
No. 525,655. Patented Sept. 4, 1894.
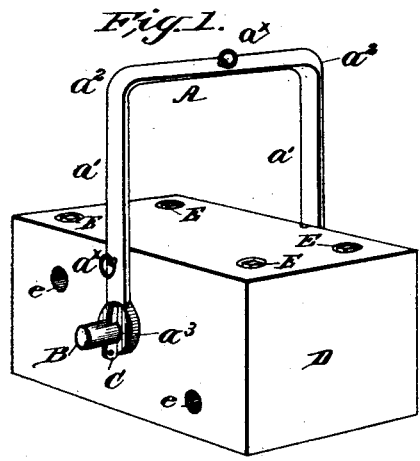
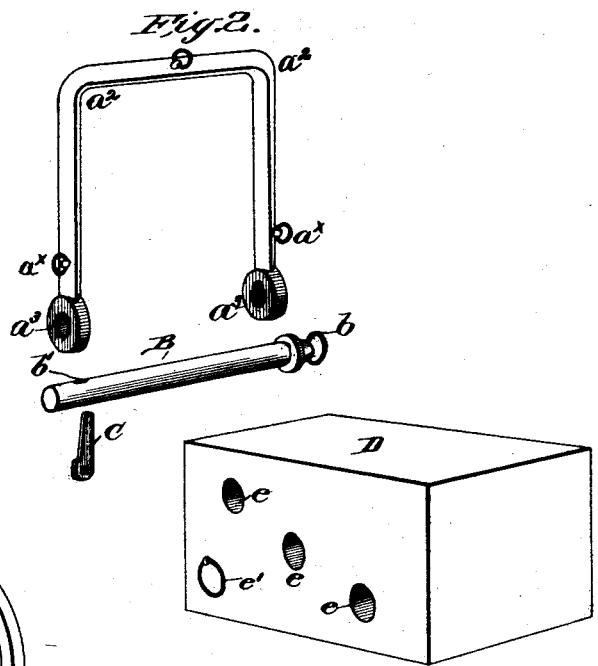
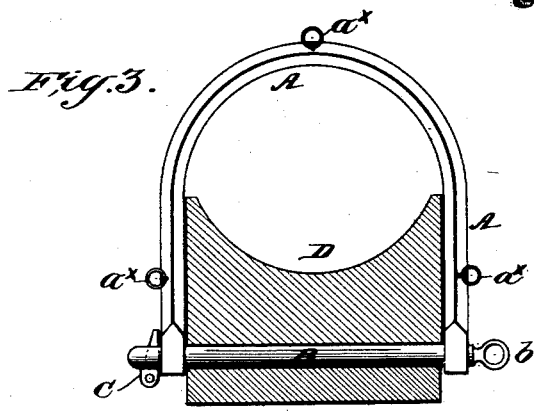
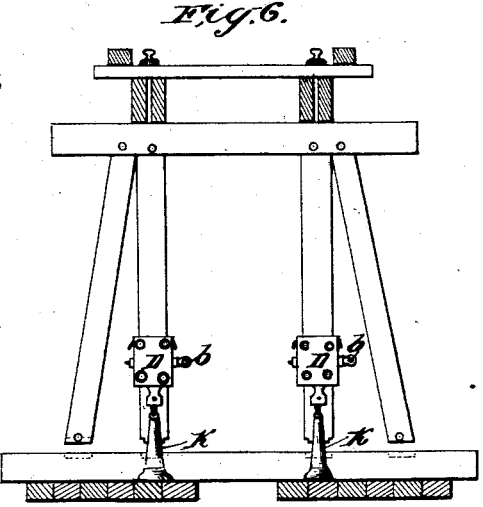
WITNESSES:
Fred G. Dieterich
H. J. Robinson
INVENTORS:
Jno. R. Hime Sr.
Willis B. Cox.
BY Munn & Co.
ATTORNEYS.

UNITED STATES PATENT OFFICE.

JOHN R. HIME, SR., AND WILLIS B. COX, OF SAVANNAH, GEORGIA.

CLAMP DEVICE.

SPECIFICATION forming part of Letters Patent No. 525,655, dated September 4, 1894.

Application filed March 23, 1894. Serial No. 504,806. (No model.)

*To all whom it may concern:*

Be it known that we, JOHN R. HIME, Sr., and WILLIS B. COX, residing at Savannah, in the county of Chatham and State of Georgia, have invented a new and Improved Clamp Device, of which the following is a specification.

Our invention relates to an improved means or clamping tool, adapted for use for repairing wharves, sheds, warehouses, trestles, bridges, and other structures, where it is the custom practiced by a great many builders to put up scaffolding, preparatory to doing the work.

Our invention has for its object to provide a simple, and easily manipulated clamping device, which can be quickly applied, and which will serve as a means of joining such parts of the structure as need be drawn or held together.

Our invention also has for its object to provide a device of the character stated, which can be used upon horizontal, vertical, inclined or other structures, and which, when fitted in place will positively and rigidly hold the separated parts together.

With other objects in view, which hereinafter will be referred to, our invention consists in a clamping device constructed substantially in the novel and peculiar manner hereinafter first described in detail, and then particularly pointed out in the appended claim, reference being had to the accompanying drawings, in which—

Figure 1 is a perspective view illustrating our improved clamp device in its preferred construction. Fig. 2 is a similar view of the clamp member and the friction block detached. Fig. 3 illustrates a slightly modified form of clamp member and block. Fig. 4 illustrates our improved devices applied for use on a truss roof. Fig. 5 shows the same applied on a pile trestling or wharf, and Fig. 6 represents a trestle frame showing our improvement applied.

Referring to the accompanying drawings, and more particularly to Fig. 1, A indicates a yoke shaped clamp member, formed preferably of wrought iron, with its cross and side portions $a^x$ $a'$ respectively diamond shape in cross section, whereby such clamp will the more thoroughly clamp against the timber it encircles, as will hereinafter more fully appear.

In the preferred construction the clamp member has its corners $a^2$, rounded, and at the ends the side portions have apertured ears $a^3$ through which is adapted to pass a wrought iron bolt or shaft B, having an eye $b$ at one end and a transverse aperture $b'$ at its opposite end, in which is adapted to fit a wedge or key C, such aperture being so constructed as to give equal bearing on each end of key.

D indicates what we term the friction block, which may be formed of wood or metal, when of wood it has transverse bolts E to strengthen it; and such block has a series of spaced or stepped like transverse apertures $e$, and a ring or rings $e'$ whereby it can be easily manipulated, the clamp member A being similarly provided with rings $a^x$ $a^x$.

In Fig. 3, a modified form of clamp and block is shown, which form is more especially adapted for use on round timbers, such as ship masts, piling, &c.

The manner in which our improved device is used is best explained as follows. When it is desired to repair, say a truss roof, of which a portion has become detached and begins to sag, and it is desired to secure it from further sagging, or to bring it back to its normal position, such separated portion is made fast to an adjacent rigid portion of the roof. In this case two of the clamp devices are used, one of which is clamped to the rigid timber G, while the other is clamped to the movable or truss beam J, which members are securely braced by means of a jack screw or other similar device K.

When used on a wharf or pile trestling but a single clamp device is used, in this case the friction block is held against one face of the pile, and forms a base support for the jack, but when used as a foundation support the block rests on the jack and the jack on the ground as shown in Fig. 6.

It will be noticed, that by providing the block with a series of apertures the clamp can be adjustably connected therewith through the medium of the bolt B so as to encompass different sized timbers.

From the foregoing taken in connection with the drawings, it is thought the advantages of our improved devices will be readily apparent. It will be seen the same can be at once applied to the desired points, and by the aid of an ordinary jack screw or similar device, it can be securely clamped in place, the sharp inner edges of the clamp portions securely binding or biting into the timber, preventing thereby any possible chance of slipping, it being manifest that the greater the pressure on or against the friction block, the tighter will be its friction bearing on the timber it abuts.

Having thus described our invention, what we claim, and desire to secure by Letters Patent, is—

As an improvement in clamp devices, the combination with the clamp block D having strengthening bolts E, and a series of diagonally arranged apertures, of a clamp bail or yoke member having a beveled inner or bearing face, and its side arms terminating in ears $a^3$, and pivot bolt B adapted to pass through ears $a^3$ and any one of the apertures, said bolt having a key way $b'$ and a key C adapted to fit the said way, all arranged substantially as shown and for the purposes described.

JOHN R. HIME, Sr.
WILLIS B. COX.

Witnesses:
CHERUBUSCO BEALE,
LEWIS A. HARRIS.